United States Patent
Sharma

(10) Patent No.: US 6,618,354 B1
(45) Date of Patent: Sep. 9, 2003

(54) CREDIT INITIALIZATION IN SYSTEMS WITH PROACTIVE FLOW CONTROL

(75) Inventor: Debendra Das Sharma, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/042,202

(22) Filed: Mar. 13, 1998

(51) Int. Cl.[7] .............................. H04L 1/00; G01R 31/08
(52) U.S. Cl. ........................................ 370/229; 370/412
(58) Field of Search ........................... 370/229, 230, 370/231, 232, 235, 236, 395, 412, 401, 400, 252, 253, 389, 395.1, 413, 414; 709/231, 232, 233, 235, 236, 222, 223

(56) References Cited

U.S. PATENT DOCUMENTS

| | | | | |
|---|---|---|---|---|
| 5,610,745 A | * | 3/1997 | Bennett | 359/139 |
| 5,633,867 A | * | 5/1997 | Ben-Nun et al. | 370/399 |
| 5,734,825 A | * | 3/1998 | Lauck et al. | 709/233 |
| 5,825,748 A | * | 10/1998 | Barket et al. | 370/236 |
| 6,002,667 A | * | 12/1999 | Manning et al. | 370/232 |
| 6,044,406 A | * | 3/2000 | Barket et al. | 709/235 |

* cited by examiner

*Primary Examiner*—Douglas Olms
*Assistant Examiner*—Brian Nguyen

(57) ABSTRACT

The inventive mechanism initializes the credit and debit registers used in a network computer system that uses proactive flow control. During initialization, the credit register is initialized to zero, while the debit register is initialized to the amount of queue space available in that particular chip release. Once the debit register is non-zero, it eventually releases the credits. These credits will be added to the credit register. These activities of adding and releasing credits take place during normal operation. Thus, the sender and destination nodes do not have to undergo any other initialization stages for setting up the credits.

30 Claims, 3 Drawing Sheets

CREDIT INITIALIZATION IN SYSTEMS WITH PROACTIVE FLOW CONTROL

TECHNICAL FIELD OF THE INVENTION

This application relates in general to network computer systems, and in specific to mechanism for initializing credit in a queue flow control system.

BACKGROUND OF THE INVENTION

The communication between different nodes in a network computer system occurs in a producer-consumer fashion. A sender or producer node sends a transaction to one or more destination or consumer node(s). Each destination node stores the transaction in an internal queue and 'consumes' it at a later point of time. For example, in a multiprocessor system, a snoop request by the source node is stored in an internal queue by all the destination nodes. Each node will act on that snoop request at some later point in time, and then removes the request from its queue. Thus, a producer should not send a transaction to a destination node that does not have the space required to store the transaction in its queue. The space requirement is ensured by the underlying flow-control mechanism.

The flow-control mechanism may be reactive or proactive. In the reactive approach, the destination node tracks its own queues and sends a queue_full signal to the respective sending nodes when the queues are filling up. However, the proactive flow-control mechanism is considered to be more useful in systems with a point-to-point interconnect topology, for example cross-bar, ring, mesh, or hypercube. In the proactive approach, the sender node keeps track of the amount of available queue space in the destination node through the amount of 'credits' it has for the corresponding queue in the destination node. Each credit translates to a certain number of entries in the destination queue. The number of available credits is maintained in a register in the sender node. This extra space register is referred to as no_credit. Each node will have one no_credit register for every queue in every destination node to which the node can send a transaction. A sender does not send a transaction if the amount of space required by the transaction is more than the number of credits it possesses for the queue in the destination node.

The destination node 'releases' these credits to the sender, when it 'consumes' a transaction from its queue. A destination node may choose to release credits as it is unloading a transaction. Or the destination node may release the credits after the transaction has been unloaded. The amount of credits released by the destination node corresponds to the amount of space freed up in the queue by consumption of a transaction. The destination node keeps track of the amount of queue space it will be releasing in a debit register. This register is referred to as no_debit. The destination node releases the credits from the no_debit register when it gets an opportunity to send a transaction to the sender node that had sent the transaction(s) earlier. Note that the destination node may append the credits onto another transaction passing through the sender node.

After releasing credits, the no_debit register is decremented by the amount of credits released. On receipt of these credits, the sender adds the credits to the amount of credits available, no_credit, for that destination node. This way the sender keeps track of the amount of queue space it can safely use in the destination node for forwarding transactions.

Note that each node many have more than one queue associated with another particular node. For example, each node may have a request queue and a response queue to store requests and responses from another node. Therefore, separate credits will be maintained for each queue by the node.

A problem occurs with the initialization of credits in the no_credit and no_debit registers, either during an initial start up or after a reset. Different components of the system may undergo different design revisions and the corresponding queue sizes may change over time for the same component. Thus, the sender nodes cannot be hardwired to assume the queue size in the destination nodes since that size may change with changes made to the components of the destination node.

Therefore, during power up, the sender does not know how many credits to allocate in the registers for each queue in the destination node. The prior art uses a software mechanism with additional hardware to perform a credit initialization. Both the credit and debit registers are set to zero. The software is used to read the maximum number of credits for each destination node, and then write that into the sender node. However, in order to perform this credit initialization transaction credits must be available. Thus, this forms a paradox where a credit initialization cannot take place until credits are available. To solve this problem, the prior art uses a 'power on mode' which allows all transactions to be sent without using credits. This mode requires extra logic and imposes a certain minimum queue sizing to allow for the reading and writing of registers. Thus, the prior art mechanism requires the user to have extensive knowledge of the system.

Therefore, there is a need in the art for a mechanism that allows for credit initialization without involving software intervention and using additional hardware.

SUMMARY OF THE INVENTION

These and other objects, features and technical advantages are achieved by a system and method which employs the mechanisms already in place and used for normal operations. During normal operations, if the sender has credits, then is may send transactions to the destination node. If the destination node has debits, then it releases them back to the sender node. During initialization, the credit register, no_credit, is loaded with a zero. Thus, the sender node begins operations with no credits, and cannot send any transactions. The debit register, no_debit, is loaded not with zero, but with the maximum credits representing the size of its queue. Thus, the destination register begins operations with the debit register full, and through normal operations, releases the credits back to the sender node. Thus, the sender node will then have credits and can then send transactions, and the destination node will have an empty debit register. This results in faster boot times, since the initialization is completed as soon as the chips are out of their reset state, which is 1 cycle after reset is withdrawn, because no time is spent on software operations in a start-up mode.

It is a technical advantage of the invention to perform initialization of the queue registers through normal flow control operations.

It is another technical advantage of the invention to eliminate the need for software credit initialization.

It is a further technical advantage of the invention to eliminate the need for additional hardware and registers for a power on mode.

It is a further technical advantage of the invention to have faster boot times, since the initialization is completed as soon as the chips are out of their reset state or 1 cycle after reset is withdrawn.

It is a further technical advantage of the invention that the inventive mechanism will work with any sized queue and does not have any minimum sizing requirements for initialization.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
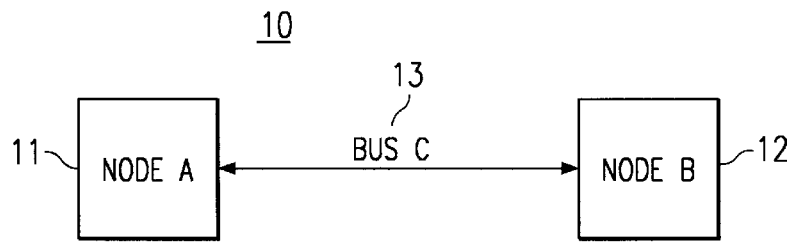
FIG. 1 depicts a network system having two nodes interconnected by a bus.

FIG. 1 depicts a simple network system 10, having two nodes, node A 11 and node B 12 connected by bus 13. Each of the nodes will have at least two queues, a request queue and a response queue, although each node could have more queues. By having separate request and response queues a deadlock situation is avoided. Node A 11 uses its request queue for holding requests that are being sent to node B 12. Node B 12 uses its request queue for holding requests receiving from node A 11. Node A 11 uses its response queue for holding response that are being sent to node B 12. Node B 12 uses its response queue for holding responses receiving from node A 11. Note that for node A 11 to send a response, node A must have received a request from node B 12, however for purposes of simplicity, assume that node A 11 is the sending node, and node B 12 is the destination node, although either node could be sending or receiving.

Figure 2:
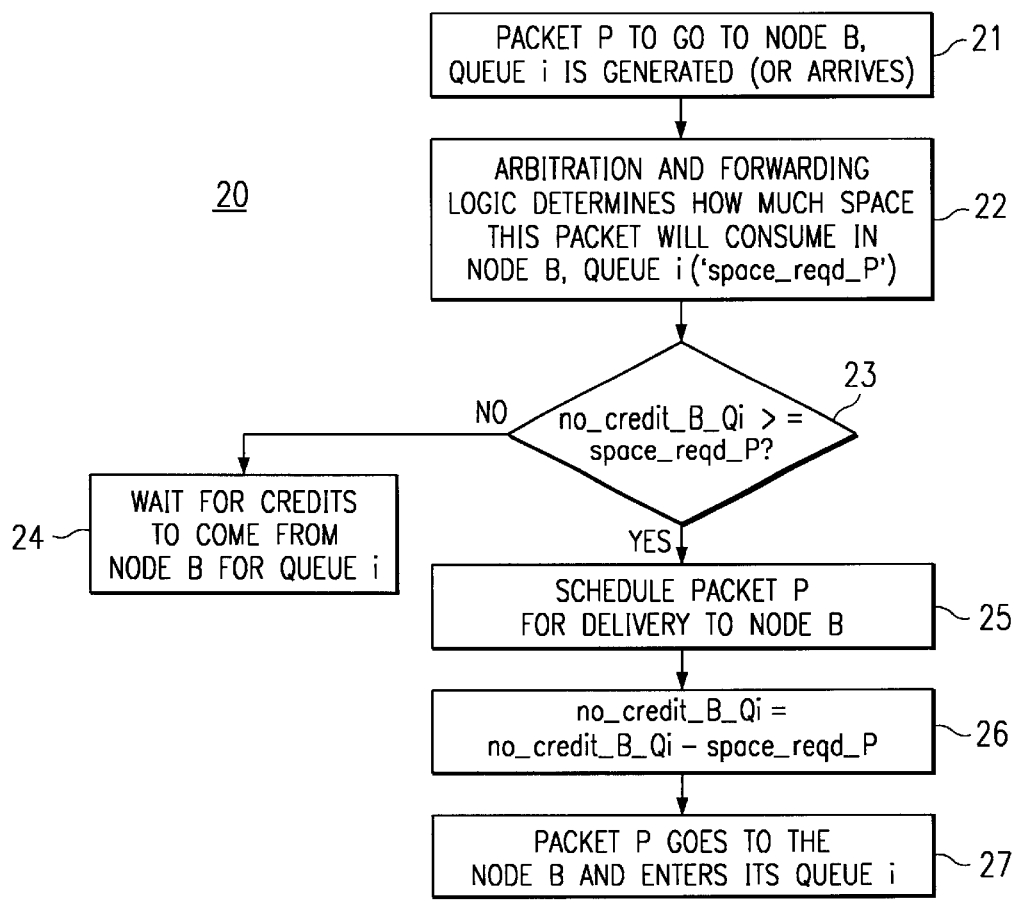
FIG. 2 depicts the flow control mechanism used by the sending node in transmitting a packet to the destination node.

FIG. 2 depicts the flow control mechanism 20 used by node A 11 in sending a packet P to destination node B 12. The sending node generates the packet P 21 for a particular queue, queue i, which could be the response queue or the request queue, or another type of queue. Note that the packet P may have been generated elsewhere, and is merely passing through node A onto node B. The arbitration and forwarding logic 22 of node A determines how much queue space this particular packet P will consume in queue i of node B. This space is called space_reqd_P. The logic then determines if the credit register for queue i of node B, no_credit_B_Qi, has a sufficient number of credits for the space required for packet P. The logic determines 23 whether no_credit_B_Qi is greater than or equal to space_reqd_P. If not, then node A 12 waits for credits 24 to be released from node B 12 before sending packet P. If there is enough credits, then packet P is scheduled 25 for delivery to node B 12. The packet P could go to a dispatch queue or be sent out to node B 12. The credit register is decremented 26 by the amount of space for packet P, no_credit_B_Qi is to no_credit_B_Qi minus space_reqd_P. Packet P is then sent out 27 to node B 12.

Figure 3:
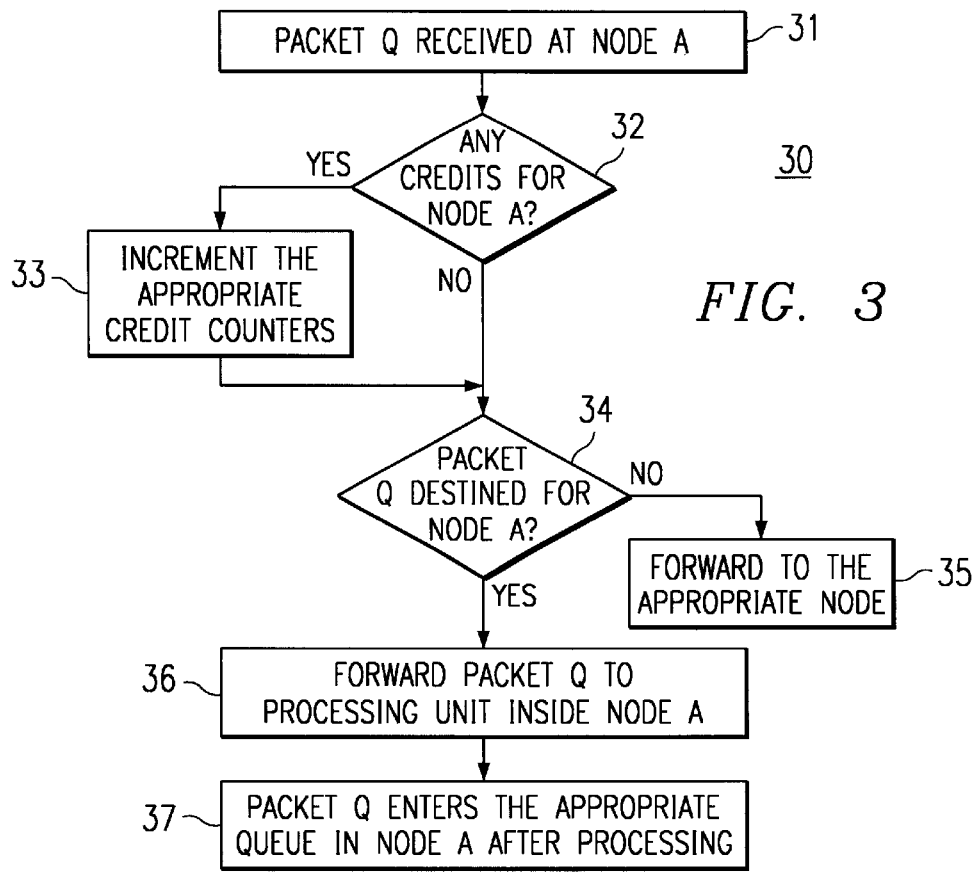
FIG. 3 depicts the flow control mechanism used by the sending node in receiving a packet from another node.

FIG. 3 depicts the flow control mechanism 30 used by node A 11 in receiving a packet Q from another node 31. The arbitration and forwarding logic of node A determines 32 whether packet Q has any released credits for node A 11. If packet Q contains credits, then the logic increments the appropriate registers by the number of credits 33. For example, if packet Q was sent by node B, then the packet may contain credits for credit register no_credit_B_Qi, in which case, no_credit_B_Qi is incremented by the number of credits in the packet. After incrementing or if there were no credits for node A, the logic then determines whether packet Q is destined 34 for node A 11. If not, the packet is forwarded to the appropriate node 35, which may be either the destination node or the next node in the chain of nodes to the destination node. If node A is the destination node, then the packet is forwarded 36 to the processing unit inside node A. Note that this sequence assumes that every node is only keeping track of the credits of the adjacent nodes. Further note that even if the packet is not destined for node A, an adjacent node may have appended credits into the packet for node A. If credits were passed back to non-adjacent nodes on a system where there is no store and forward, the credits would be released at the destination nodes only.

Figure 4:
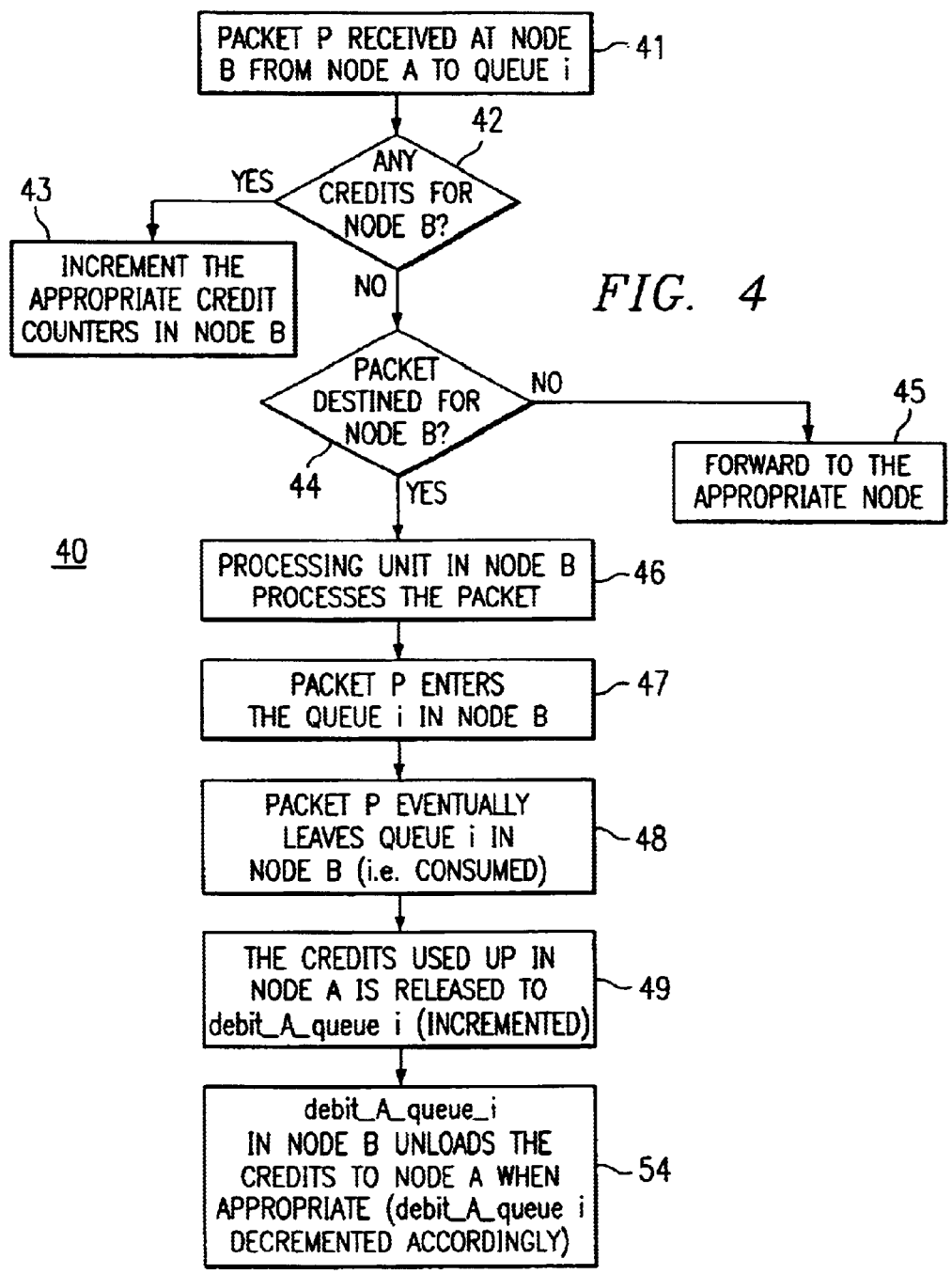
FIG. 4 depicts the flow control mechanism 40 used by the destination node in receiving a packet from the sending node.

FIG. 4 depicts the flow control mechanism 40 used by node B 12 in receiving a packet P 41 via bus C 13 from node A 11, as shown in box 27. Since node B is also a sending node, its arbitration and forwarding logic determines 42 whether packet P has any released credits for node B 12. If packet P contains credits, then the logic increments the appropriate counters by the number of credits 43. After or during incrementing or if there were no credits for node B, then the logic then determines whether packet P is destined 44 for node B 12. If not, the packet is forwarded to the appropriate node 45, which may be either the destination node or the next node in the chain to the destination node. If node B is the destination node, then the packet is forwarded 46 to the processing unit inside node B. Packet P then enters 47 queue i in node B 12. If packet P is a request packet, then queue i is the request queue. If packet P is a response packet, then queue i is the response queue. After a time period, packet P will leave queue i and be consumed 48. For example, if packet P is a request, then as soon as the response is generated the request is removed. Another example is that the packet may be moved to another queue within node B. After the packet is consumed, then credits are released to the debit counter, debit_A_queue i, which is incremented 49 by the appropriate value of the credits. Node B will unload the credits in the debit register to node A when appropriate 54. Note that a specific packet, a credit packet, could be generated by node B to send the credits back to node A, or node B could append the credits onto a data or information packet that is either destined node A or passing through node A. Note that node A does not have to be the destination of the information packet. Further note that node B may not have constructed the information packet, node B may just be passing the packet along the node chain. The entire contents of the debit register may be loaded into the packet bound for node A, or only a portion of the contents may be loaded. Thus, either several packets or a single packet may be used to send the credit back to node A. The debit register, debit_A_queue i is decremented according to the number of credits unloaded. Note that a specific wire may be also used to send the credits back instead of packets. The returned credits will be handled by node A as shown in FIG. 3.

Figure 5:
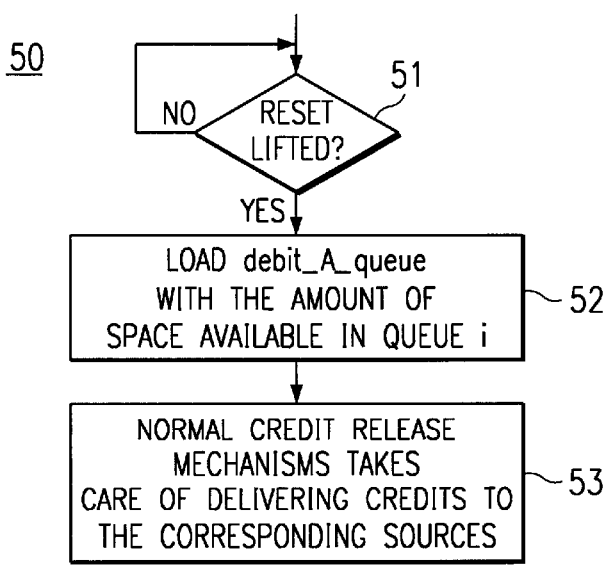
FIG. 5 depicts the flow control mechanism in the destination node during a power on or reset condition of the system.

FIG. 5 depicts the flow control mechanism 50 in node B during a power on or reset condition of the system 10. The arbitration and forwarding logic of node B first determines whether the reset condition has been lifted 51. If not, node B waits until the reset condition is lifted. After the reset condition has been lifted, the debit register, debit_A_queue is loaded 52 with the maximum value that queue i can store. The debit register is then unloaded and decremented using the normal release mechanisms 53, as shown in FIG. 4. Note that the maximum value of queue i is set in hardware, e.g. via a register, since the values of the queues of are known at the time of design. Thus, no software is needed.

The arbitration and forwarding logic of node A would also determine whether the reset condition has been lifted, and if not, node A waits until the reset condition is lifted. After the reset condition has been lifted, the credit register, no_credit_B_Qi is loaded with the value zero. A packet will come from node B containing the released credits, which will be handled by node A as shown in FIG. 3. Thus, the credit register of node A will be properly set to the number of credits that queue i in node B can hold.

Note that this mechanism will operate for each queue in node B that is used by node A. Further note that this mechanism will operate for each queue in node A that is used by node B, as each node can both send and receive, and thus will have both credits and debits for the different registers.

Although the present invention and its advantages have been described in detail, it should be understood that various changes, substitutions and alterations can be made herein without departing from the spirit and scope of the invention as defined by the appended claims.

What is claimed is:

1. A method for initializing credit in a credit register used for flow control that is resident on a first node of a multinode computer system, the method comprising the steps of loading an initial credit value into a debit register resident on a second node of the multinode computer system;

loading the credit register with a zero prior to the step of transferring; and transferring the initial credit value into the credit register by using operational mechanisms of the system.

2. The method of claim 1, wherein:

the initial credit value is equal to a size of a queue that is resident on the second node and receives information from the first node.

3. The method of claim 1, wherein:

the step of loading is performed after a reset condition has been lifted.

4. The method of claim 1, wherein the step of transferring comprises the steps of:

placing the initial credit value into a packet which is bound for the first node;

decrementing the debit register by the initial credit value; and sending the packet to the first node.

5. The method of claim 4, wherein the step of transferring further comprises the steps of:

receiving, by the first node, the packet from the second node;

determining whether the packet is destined for the first node;

forwarding the packet to another node, if the packet is not destined for the first node; and processing the packet, if the packet is destined for the first node.

6. The method of claim 4, wherein the step of transferring further comprises the steps of:

receiving, by the first node, the packet from the second node;

inspecting the packet, by the first node, to determine whether the packet includes credits for the first node; and incrementing the credit register by a value of the credits determined to be in the packet.

7. The method of claim 6, further comprising the step of:

sending a subsequent packet to the second node from the first node.

8. The method of claim 7, wherein the second node includes a queue that receives information from the first node, wherein the step of sending the subsequent packet comprises the steps of:

determining an amount of space that the subsequent packet will require in the queue of the second node;

comparing the amount of space with a number of credits in the credit register;

sending the subsequent packet to the second node if the amount of space is less than the number of credits; and holding the subsequent packet until the amount of space is less than the number of credits if the amount of space is not less than the number of credits.

9. The method of claim 8, wherein the step of sending the subsequent packet further comprises the step of:

decrementing the credit register by the amount of space.

10. The method of claim 8, further comprising the steps of:

receiving, by the second node, the subsequent packet from the first node;

inspecting the packet, by the second node, to determine whether the subsequent packet includes credits for the second node; and incrementing a credit register of the second node by the value of the credits determined to be in the subsequent packet.

11. The method of claim 8, further comprising the steps of:

receiving, by the second node, the subsequent packet from the first node;

determining whether the subsequent packet is destined for the second node;

forwarding the subsequent packet to another node, if the subsequent packet is not destined for the second node; and processing the subsequent packet, if the subsequent packet is destined for the second node.

12. The method of claim 11, further comprising the steps of:

consuming, by the second node, the subsequent packet; and releasing, by the second node, the amount of credits to the first node.

13. A method for initializing credit in a credit register used for flow control that is resident on a first node of a multinode computer system, the method comprising the steps of:

loading an initial credit value into a debit register resident on a second node of the multinode computer system;

loading the credit register with a zero prior to the step of transferring; and transferring the initial credit value into the credit register by using operational mechanisms of the system;

wherein the initial credit value is equal to a size of a queue that is resident on the second node and receives information from the first node, and the steps of loading are performed after a reset condition has been lifted.

14. The method of claim 13, wherein the step of transferring comprises the steps of:

placing the initial credit value into a packet which is bound for the first node;

decrementing the debit register by the initial credit value; and sending the packet to the first node.

15. The method of claim 14, wherein the step of transferring further comprises the steps of:

receiving, by the first node, the packet from the second node;

inspecting the packet, by the first node, to determine whether the packet includes credits for the first node; and incrementing the credit register by a value of the credits determined to be in the packet.

16. A mechanism for initializing credit in a credit register used for flow control that is resident on a first node of a multinode computer system, the mechanism comprising:

means for loading an initial credit value into a debit register resident on a second node of the multinode computer system;

means for loading the credit register with a zero which operates prior to the means for transferring; and means for transferring the initial credit value into the credit register using operational mechanisms of the system.

17. The mechanism of claim 16, wherein:

the initial credit value is equal to a size of a queue that is resident on the second node and receives information from the first node.

18. The mechanism of claim 16, wherein:

the means for loading operates after a reset condition has been lifted.

19. The mechanism of claim 16, wherein the means for transferring comprises:

means for placing the initial credit value into a packet which is bound for the first node;

means for decrementing the debit register by the initial credit value; and means for sending the packet to the first node.

20. The mechanism of claim 19, wherein the means for transferring further comprises:

means for receiving the packet from the second node;

means for determining whether the packet is destined for the first node;

means for forwarding the packet to another node, if the packet is not destined for the first node; and means for processing the packet, if the packet is destined for the first node.

21. The mechanism of claim 19, wherein the means for transferring further comprises:

means for receiving the packet from the second node;

means for inspecting the packet to determine whether the packet includes credits for the first node; and means for incrementing the credit register by a value of the credits determined to be in the packet.

22. The mechanism of claim 21, further comprising:

means for sending a subsequent packet to the second node from the first node.

23. The mechanism of claim 22, wherein the second node includes a queue that receives information from the first node, wherein the means for sending the subsequent packet comprises:

means for determining an amount of space that the subsequent packet will require in the queue of the second node;

means for comparing the amount of space with a number of credits in the credit register;

means for sending the subsequent packet to the second node if the amount of space is less than the number of credits; and means for holding the subsequent packet until the amount of space is less than the number of credits if the amount of space is not less than the number of credits.

24. The mechanism of claim 23, wherein the means for sending the subsequent packet further comprises:

means for decrementing the credit register by the amount of space.

25. The mechanism of claim 23, further comprising:

means for receiving the subsequent packet from the first node;

means for inspecting the packet to determine whether the subsequent packet includes credits for the second node; and means for incrementing a credit register of the second node by the value of the credits determined to be in the subsequent packet.

26. The mechanism of claim 23, further comprising:

means for receiving the subsequent packet from the first node;

means for determining whether the subsequent packet is destined for the second node;

means for forwarding the subsequent packet to another node, if the subsequent packet is not destined for the second node; and means for processing the subsequent packet, if the subsequent packet is destined for the second node.

27. The mechanism of claim 26, further comprising:

means for consuming, by the second node, the subsequent packet; and means for releasing, by the second node, an amount of credits to the first node, wherein the amount of credits equals the amount of space.

28. A mechanism for initializing credit in a credit register used for flow control that is resident on a first node of a multinode computer system, the mechanism comprising:

first means for loading an initial credit value into a debit register resident on a second node of the multinode computer system;

second means for loading the credit register with a zero; and means for transferring the initial credit value into the credit register by using operational mechanisms of the system;

wherein the initial credit value is equal to a size of a queue that is resident on the second node and receives information from the first node, and the first and second means for loading operate after a reset condition has been lifted.

29. The mechanism of claim 28, wherein the means for transferring comprises:

means for placing the initial credit value into a packet which is bound for the first node;

means for decrementing the debit register by the initial credit value; and means for sending the packet to the first node.

30. The mechanism of claim 20, wherein the means for transferring further comprises:

means for receiving the packet from the second node;

means for inspecting the packet to determine whether the packet includes credits for the first node; and means for incrementing the credit register by a value of the credits determined to be in the packet.

* * * * *